United States Patent [19]
Sato

[11] Patent Number: 5,475,872
[45] Date of Patent: Dec. 12, 1995

[54] PORTABLE TELEPHONE WITH EXTERNAL TRANSMITTER-RECEIVER CONNECTIONS

[75] Inventor: Tsutomu Sato, Kanagawa, Japan

[73] Assignee: Sony Corporation, Tokyo, Japan

[21] Appl. No.: 175,520

[22] Filed: Dec. 30, 1993

[30] Foreign Application Priority Data

Jan. 14, 1993 [JP] Japan ................. 5-021875

[51] Int. Cl.[6] ............. H04B 1/38; H04M 11/02
[52] U.S. Cl. ............. 455/89; 455/90; 455/351; 379/61; 379/373; 379/430
[58] Field of Search ............. 455/89, 90, 347, 455/348, 350, 351, 78; 381/25, 74, 123; 379/420, 422, 433, 438, 430, 256, 58, 59, 61, 63, 373, 375; 439/188; 200/51.1

[56] References Cited

U.S. PATENT DOCUMENTS

| | | | |
|---|---|---|---|
| 4,433,209 | 2/1984 | Kurosawa et al. | 381/25 |
| 4,591,661 | 5/1986 | Benedetto et al. | 379/63 |
| 4,792,986 | 12/1988 | Garner et al. | 455/89 |
| 4,930,156 | 5/1990 | Morris | 379/420 |
| 4,982,424 | 1/1991 | Saito et al. | 379/58 |
| 5,172,408 | 12/1992 | Petty et al. | 379/375 |
| 5,257,413 | 10/1993 | Warner et al. | 455/89 |
| 5,301,360 | 4/1994 | Goldberg | 455/89 |
| 5,303,284 | 4/1994 | Shinozaki | 379/58 |

FOREIGN PATENT DOCUMENTS

| | | | |
|---|---|---|---|
| 1213056 | 8/1989 | Japan | 379/420 |
| 2174578 | 11/1986 | United Kingdom | 379/420 |

OTHER PUBLICATIONS

European Patent Application EP 0 464 011 A1, Jun. 10, 1991 (Hansson).

UK Patent Applicaiton GB 2 261 576 A, Nov. 13, 1992 (Makino et al.).

Primary Examiner—Reinhard J. Eisenzopf
Assistant Examiner—Lisa Charouel
Attorney, Agent, or Firm—Jay H. Maioli

[57] ABSTRACT

A transmitter-receiver comprises a transmitter, a transmitter circuit, a receiver circuit, a receiver, a jack, and a switch. The transmitter circuit converts a first audio signal to a transmit signal and transmits the transmit signal. The receiver circuit extracts a second audio signal from a received signal. The jack is adapted to be connected with a plug of an external transmitter-receiver. The switch is on/off controlled dependent on whether or not the jack of the external transmitter-receiver is connected with the plug. The switch, when the jack is not connected with the plug, supplies the first audio signal from the transmitter to the transmitter circuit and also supplies the second audio signal from the receiver circuit selectively to the receiver. Further, the switch, when the jack is connected with the plug, supplies an input signal from the external transmitter-receiver to the transmitter circuit through the connected plug and jack and also supplies the second audio signal from the receiver circuit selectively to the external transmitter-receiver through the connected jack and plug.

10 Claims, 5 Drawing Sheets

FIG. 1

(PRIOR ART)

PORTABLE TELEPHONE WITH EXTERNAL TRANSMITTER-RECEIVER CONNECTIONS

BACKGROUND

1. Field of the Invention

The present invention relates to a transmitter-receiver. More particularly, the present invention relates to a transmitter-receiver to which an external transmitter and receiver can be connected.

2. Background of the Invention

Although a portable telephone set has a transmitter and a receiver incorporated therein, there is a portable telephone with which an external transmitter and receiver, hereinafter briefly called "external transmitter-receiver", can be used.

Figure 1:
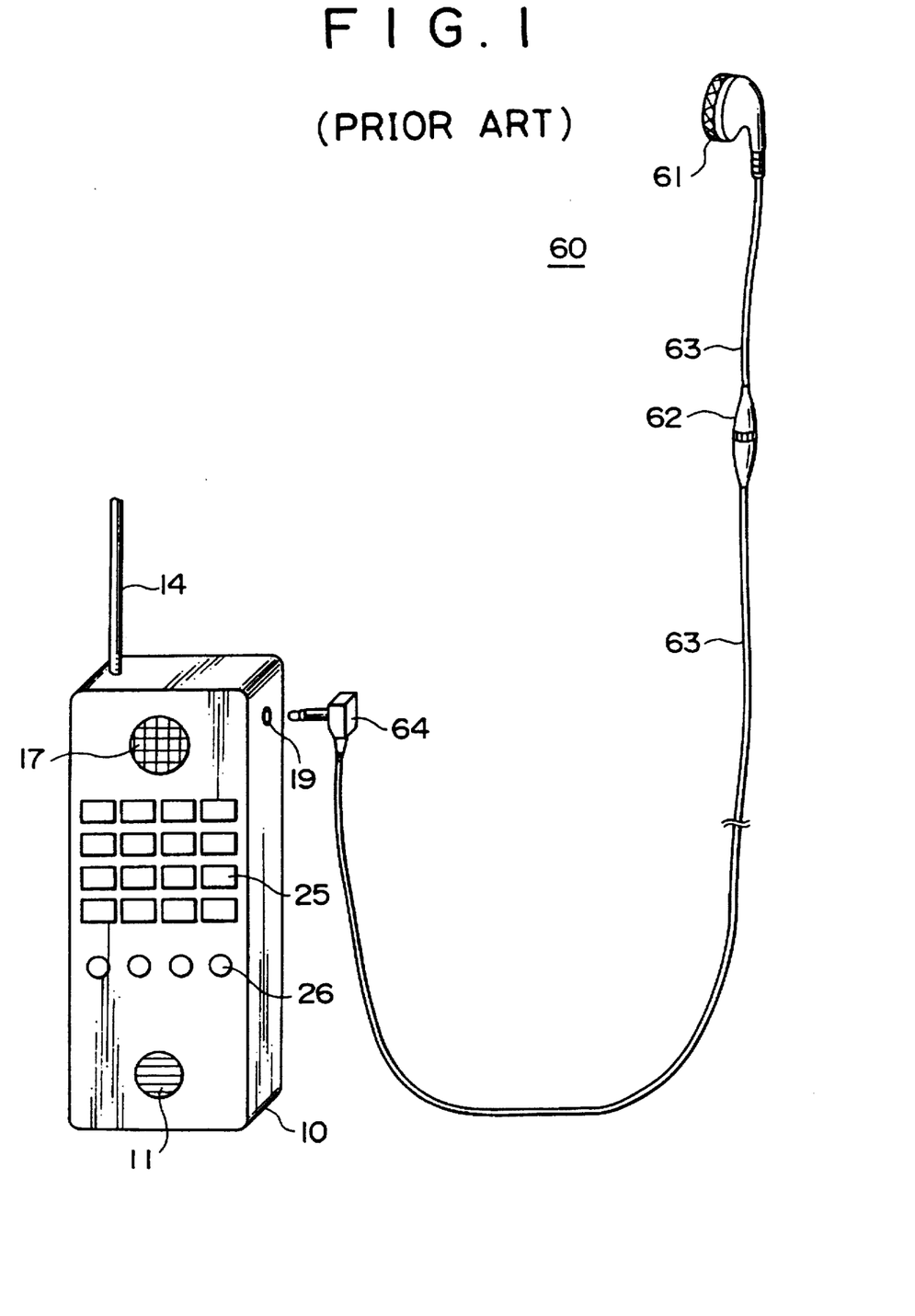
FIG. 1 shows an example of a transmitter-receiver of a related art.
Figure 2:
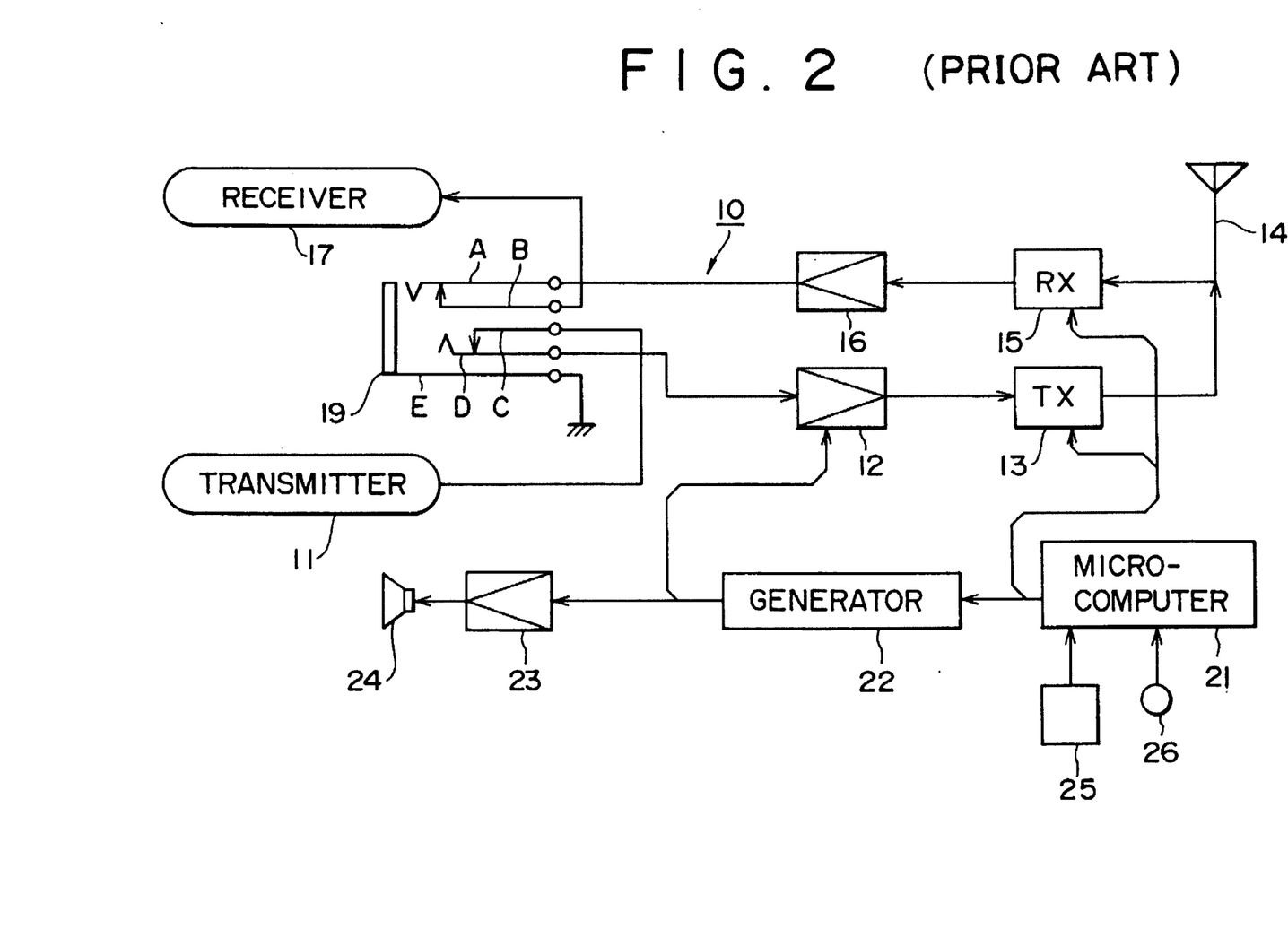
FIG. 2 shows a circuit diagram of the transmitter-receiver shown in FIG. 1.

FIG. 1 shows appearance of such a portable telephone 10, as well as an earphone-microphone 60 as an example of such an external transmitter-receiver, and FIG. 2 shows an example of circuit configuration of the portable telephone 10. Referring to FIG. 2, reference numeral 11 denotes a transmitter incorporated in the body, 13 denotes a transmitter circuit, 15 denotes a receiver circuit, 17 denotes a receiver incorporated in the body, and 19 denotes a connector jack to which a plug of a later described earphone-microphone is connected.

When speaking over the telephone, an audio signal from the transmitter 11 is supplied to the transmitter circuit 13 through a signal path of a switch contact C of the jack 19→an input contact D of the jack 19→an amplifier 12. The audio signal supplied to the transmitter circuit 13 is converted in the transmitter circuit 13 to a transmit signal for the up channel and the transmit signal is transmitted from a transmit/receive antenna 14 to a base station. A transmit signal transmitted from the base station over the down channel is received by the antenna 14 and supplied to the receiver circuit 15, in which an audio signal from the other party is extracted from the received transmit signal. The audio signal extracted by the receiver circuit 15 is supplied to the receiver 17 through a signal path of an amplifier 16→an output contact A of the jack 19→a switch contact B of the jack 19. Character E in the jack 19 denotes a grounded contact as the common contact. Conversation by telephone using a portable telephone can be achieved in the described manner.

Reference numeral 21 denotes a microcomputer for system control, 22 denotes a signal generator for generating a DTMF signal, a ringer sound signal, and the like, 24 denotes an incorporated speaker as a ringer, 25 denotes dial keys, and 26 denotes various control keys. The above described circuits are controlled by the microcomputer 21 and, thereby, sending a call, receiving a call, talking as described above, terminating a call, and the like are achieved.

Accordingly, the portable telephone 10 as a separated unit can be used in the same way as a general portable telephone is used. The transmitter 11, receiver 17, jack 19, antenna 14, dial keys 25, and control keys 26 are installed on the body of the telephone 10 as shown in FIG. 1, whereas the transmitter circuit 13, receiver circuit 15, and other circuits such as a power supply circuit are contained in the telephone body 10.

On the other hand, the earphone-microphone 60, as shown in FIG. 1, has an earphone 61 of an inner-ear type serving as a receiver and a microphone 62 serving as a transmitter. The earphone 61 and microphone 62 are connected to a connector plug 64 by a flexible connection cord 63. In this case, the earphone 61 is joined to the end of the cord 63. The microphone 62 is provided midway along the cord 63 approximately 13 to 15 (cm) apart from the earphone 61, i.e., where it can suitably collect the speech of the user when the user of the telephone 10 sets the earphone 61 to his ear, for example at the level around the mouth to throat. For an inner-ear type earphone, refer for example to U.S. Pat. No. 4,736,435.

When the plug 64 of the earphone-microphone 60 is inserted into the jack 19, the contacts C and D of the jack 19 are turned off and the microphone 62 of the earphone-microphone 60 is connected to the input contact D by the plug 64 as shown in FIG. 2. At the same time, the contacts A and B of the jack 19 are turned off and the earphone 61 of the earphone-microphone 60 is connected to the output contact A by the plug 64. As a result, the transmitter 11 and receiver 17 incorporated in the telephone are cut off from the amplifiers 12 and 16, respectively, but, instead, the microphone 62 and earphone 61 of the earphone-microphone 60 are connected to the amplifiers 12 and 16, respectively and thus conversation by telephone can be achieved using the earphone-microphone 60.

Figure 3:
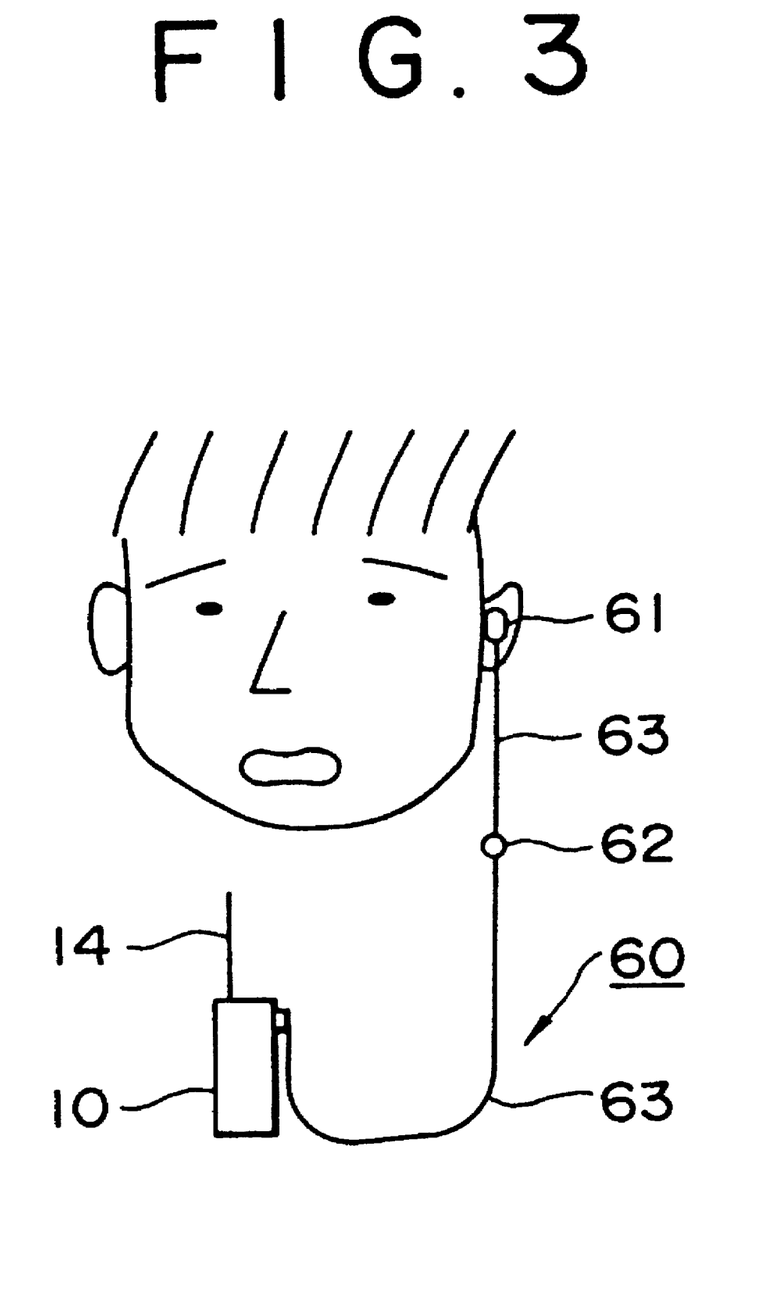
FIG. 3 is a diagram showing a state of the transmitter-receiver shown in FIG. 1 in use.

When the earphone 61 is set to the ear for example as shown in FIG. 3, it is not necessary to hold the transmitter-receiver while talking. Therefore, it is possible to keep the hands free while talking. When a call comes in while the user is walking, the user can receive the call by pushing a single key 26 of the portable telephone 10 and, hence, the telephone can be used more conveniently than when the transmitter 11 and receiver 17 of the portable telephone 10 are used.

As described above, the jack 19 is provided with mechanical switch contacts B and C and it should be arranged such that the contacts B and C separate from the contacts A and D, respectively to turn off when the plug 64 is inserted in the jack 19, while the contacts B and C contact the contacts A and D, respectively to turn on when the plug 64 is not inserted in the jack 19.

When the jack 19 is provided with such two switch contacts, the jack 19 becomes larger in size and this prevents realization of a small-sized telephone 10. Further, it places restrictions on wiring to the jack 19 or on the pattern of the printed board.

When the earphone-microphone 60 is connected to a portable telephone 10, the ringer sound announcing an incoming call is output only from the earphone 61 of the earphone-microphone 60. Therefore, when the user of the telephone 10 does not have the earphone 61 set to his ear, the ringer sound of the incoming call cannot be heard. When it is arranged such that the ringer sound is output only from the speaker 24 of the telephone 10, it may occur, when the earphone 61 is set to the ear, that the ringer sound of the incoming call is shielded by the earphone 61 and the incoming call is left unnoticed.

Therefore, when an earphone-microphone 60 is connected to a portable telephone 10, the ringer sound must be output from both of the earphone 61 of the earphone-microphone 60 and the speaker 24 of the telephone 10. However, the ringer sound output from the earphone 61 should be low enough not to adversely affect the sense of hearing. When the earphone-microphone 60 is not connected to the portable telephone 10, a ringer sound with a sufficient volume should be output from the speaker 24.

It is impossible to output the ringer sound with the above described volume by the use of the switch contact C of the jack 19. It is needed to provide a further contact in the jack 19 so that the path for supplying the ringer sound to the earphone 61 and the path for supplying the ringer sound to the speaker 24 are separated and properly adjusted ringer sounds are supplied through the paths.

SUMMARY OF THE INVENTION

It is, therefore, an object of the invention to provide a transmitter-receiver which resolves the above mentioned problems.

According to an aspect of the present invention, there is provided a transmitter-receiver. The transmitter-receiver includes a transmitter, a transmitter circuit, a receiver circuit, a receiver, a jack, and a switch. The transmitter circuit converts an audio signal to a transmit signal and transmits the transmit signal. The receiver circuit extracts an audio signal from a received signal. The jack is adapted to be connected with a plug of an external transmitter-receiver. The switch is adapted to be on/off controlled dependent on whether or not the jack is connected with the plug. The switch, when the jack is not connected with the plug, supplies an audio signal from the transmitter to the transmitter circuit and also supplies an audio signal from the receiver circuit selectively to the receiver. The switch, further, when the jack is connected with the plug, supplies an audio signal from the external transmitter-receiver to the transmitter circuit through the plug and the jack and also supplies an audio signal from the receiver circuit selectively to the external transmitter-receiver through the jack and the plug.

According to another aspect of the invention, there is provided a transmitter-receiver. The transmitter-receiver includes a transmitter, a transmitter circuit, a receiver circuit, a receiver, a jack, a controller, and a generator. The transmitter circuit converts an audio signal to a transmit signal and transmits the transmit signal. The receiver circuit extracts an audio signal from a received signal. The jack is adapted to be connected with a plug of an external transmitter-receiver. The controller is adapted to be on/off controlled dependent on whether or not the jack is connected with the plug. The controller, when the jack is not connected with the plug, selectively supplies an audio signal from the transmitter to the transmitter circuit and also selectively supplies an audio signal from the receiver circuit to the receiver. The controller, when the jack is connected with the plug, selectively supplies an audio signal from the external transmitter-receiver to the transmitter circuit through the connected plug and jack and also selectively supplies an audio signal from the receiver circuit to the external transmitter-receiver through the connected jack and plug. The generator generates a ringer sound signal. When a call comes in, a ringer sound signal output from the signal generator is supplied by the controller to each of the transmitter and the external transmitter-receiver through the jack.

According to the invention, whether the jack is connected with the plug of the external transmitter-receiver or not is detected as an output signal of the switch. Dependent on this output signal, either the transmitter and the receiver of the transmitter-receiver or the external transmitter and receiver are selectively connected to the transmitter circuit and the receiver circuit, respectively. In the present invention, conversing by telephone and receiving a call can be achieved by using the transmitter and the receiver of the transmitter-receiver or the external transmitter-receiver. Further, since the number of the switch contacts of the jack is reduced, a smaller-sized jack can be fabricated and, hence, a smaller-sized transmitter-receiver can be realized.

BRIEF DESCRIPTION OF THE DRAWINGS

The invention will be more readily understood with reference to the accompanying drawings, wherein.

DESCRIPTION OF THE INVENTION

Figure 4:
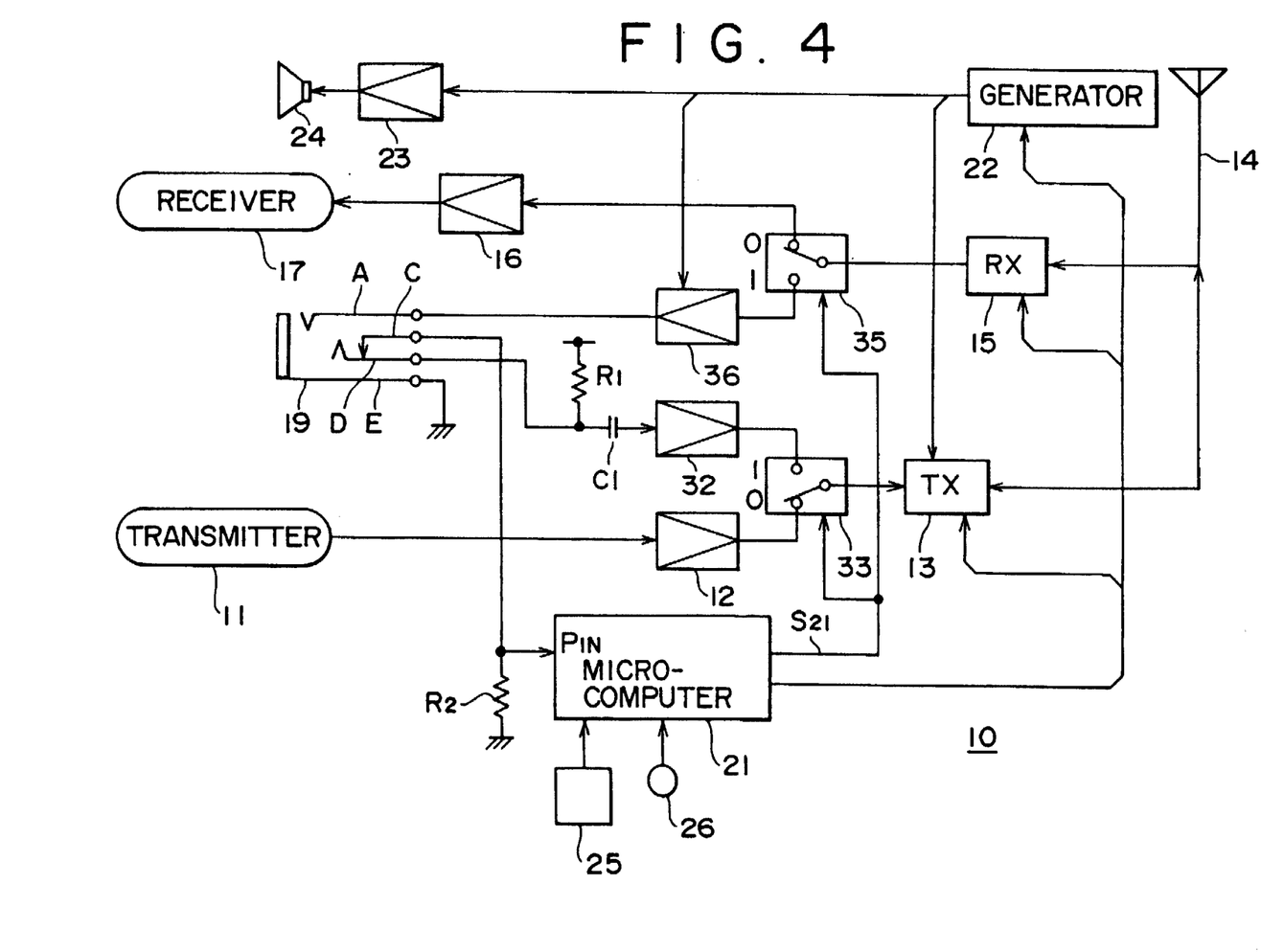
FIG. 4 is a circuit diagram showing a structure of a transmitter-receiver according to the present invention.

The structure of the transmitter-receiver according to the invention will be described below with reference to the accompanying drawings. In the present embodiment, description will be given with a portable telephone taken as an example of the transmitter-receiver as shown in FIG. 1. Regarding the parts which are in common with FIGS. 1 and 2, the description given above will be invoked. Referring to FIG. 4, the connector jack 19 has only the switch contact C, other than the output contact A, input contact D, and grounding contact E. The switch contact C and input contact D constitute a normally closed switch.

The input contact D of the jack 19 is connected to the input terminal of the microphone amplifier 32 through a blocking capacitor C1. Between the output terminals of the amplifiers 32 and 12 and the input terminal of the transmitter circuit 13, there is provided a switch circuit 33. The input contact D of the jack 19 is connected to the power supply line through a resistor R1.

The switch contact C of the jack 19 is grounded through a resistor R2 and also connected with an input port PIN of the microcomputer 21. The output terminal of the receiver circuit 15 is selectively connected to either of the input terminals of amplifiers 16 and 36 through a switch circuit 35, while the output terminal of the amplifier 36 is connected to the output contact E of the jack 19. A portion of the ringer sound signal from the signal generator 22 is supplied to the amplifier 36. In this case, resistance values of the resistor R1 and resistor R2 are selected to satisfy the condition R1<<R2.

A signal S21 is taken out from the output port of the microcomputer 21, which signal takes on a level of "1" when the level at the input port PIN is "0" and takes on a level of "0" when the level at the input port PIN is "1", and this signal S21 is supplied to the switch circuits 33 and 35 as their control signals.

Figure 5:
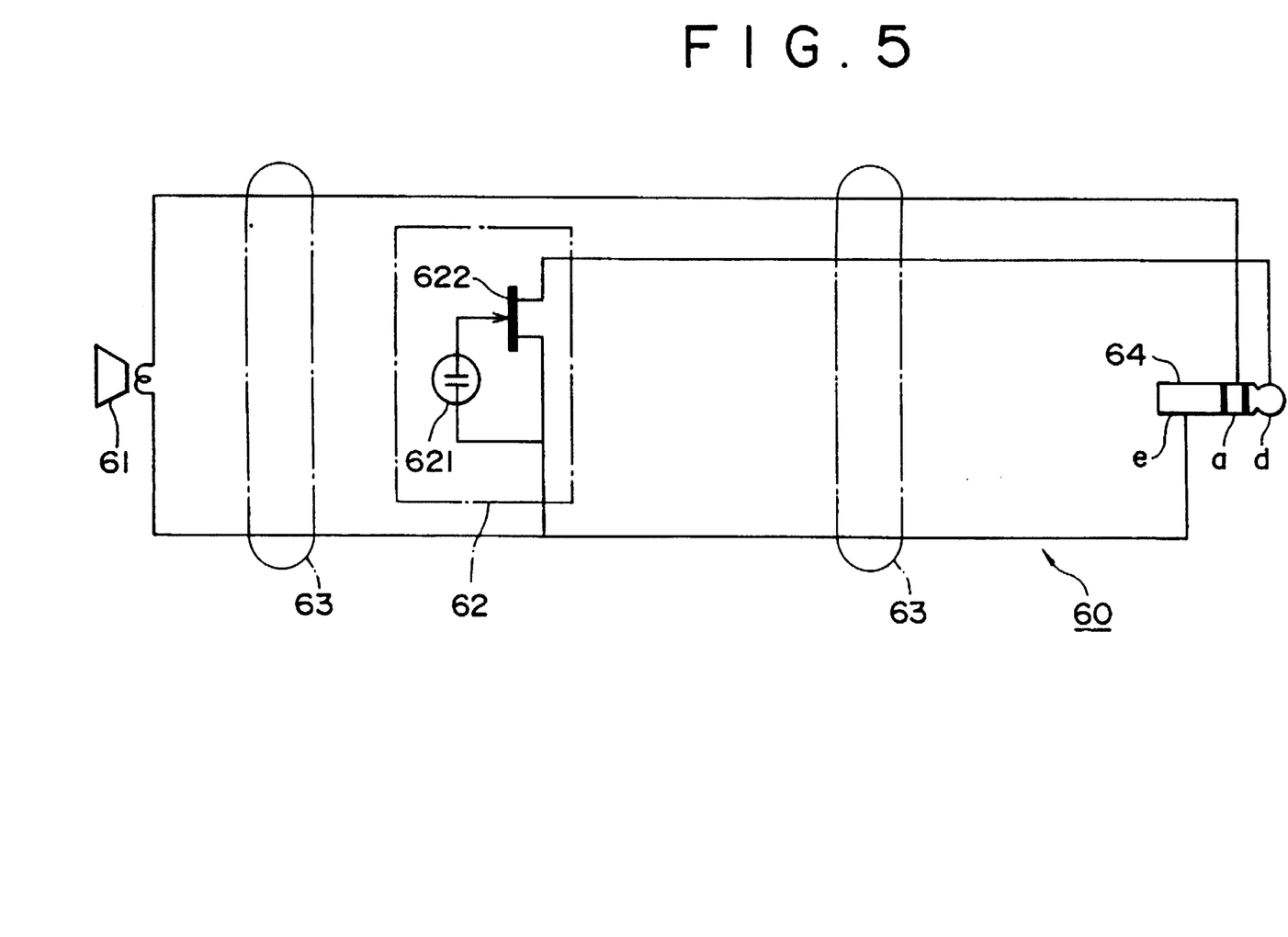
FIG. 5 is a diagram showing a structure of an earphone-microphone which can be used in the transmitter-receiver according to the present invention.

Meanwhile, the earphone-microphone 60 to be connected to the transmitter-receiver of the invention is structured as shown in FIG. 5. The earphone 61 is connected to contacts a and e of the connector plug 64 by the cord 63. The microphone 62, for which an electret condenser microphone unit is used, is integrally formed of an electret condenser microphone unit 621 and an FET 622 serving as an amplifier and buffer. The unit 621 is connected across the gate and source of the FET 622, while the drain and the source of the FET 622 are connected to the contacts d and e of the plug 64 by the cord 63. Incidentally, the contacts d, a, and e of the plug 64 correspond to the contacts D, E, and E of the jack 19.

In the transmitter-receiver structured as described above, when the plug 64 is not inserted in the jack 19, the switch contact C of the jack 19 is in connection with the input contact D as shown in FIG. 4. Therefore, the supply voltage is divided by the resistors R1 and R2 and the divided voltage is supplied to the input port PIN of the microcomputer 21. At this time, since the resistance values of the resistor R1 and resistor R2 are in the relationship R1<<R2, the divided voltage supplied to the input port PIN takes on a level of "1". Since the input port PIN is at the level "1", the control signal S21 becomes as S21="0", and, by this control signal S21, the switch circuits 33 and 35 are put in the connected states shown in FIG. 4.

Accordingly, while conversation by telephone is held, an audio signal from the transmitter 11 incorporated in the telephone 10 is supplied to the transmitter circuit 13 through the amplifier 12 and switch circuit 33, and an audio signal from the receiver circuit 15 is supplied to the receiver 17 of the telephone body through the switch circuit 35 and the amplifier 16. Therefore, while the plug 64 is not inserted in the jack 19, talking over the telephone can be done by the use of the transmitter 11 and receiver 17 incorporated in the telephone 10.

When a call comes in, a ringer sound signal from the signal generator 22 is supplied to the incorporated speaker 24 through the amplifier 23 and, hence, a ringer sound announcing an incoming call is output from the speaker 24 with a sufficient volume.

On the other hand, when the plug 64 is inserted in the jack 19, the switch contact C of the jack 19 is separated from the input contact D. Accordingly, the input port PIN of the microcomputer 21 is pulled down by the resistor R2 to take on a "0" level. When the input port PIN is brought to the level "0", the control signal S21 becomes as S21="1", and, by this control signal S21, the switch circuits 33 and 35 are brought into connected states opposite to those shown in FIG. 4.

At this time, since the contacts d and e of the plug 64 are put into connection with the contacts D and E of the jack 19, the resistor R1 acts as a drain resistor of the FET 622 and the FET 622 serves as a grounded-source amplifier. Consequently, an audio signal from the microphone unit 621 is supplied to the transmitter circuit 13 through the signal path of the FET 622→contact d of the plug 64→contact D of the jack 19→capacitor C1→amplifier 32→switch circuit 33. Further, since the contact a of the plug 64 is connected to the contact A of the jack 19, an audio signal from the receiver circuit 15 is supplied to the earphone 61 through the signal path of the switch circuit 35→amplifier 36→contact A of the jack 19→contact a of the plug 64. Accordingly, when the plug 64 is inserted in the jack 19, conversation by telephone can be achieved using the microphone 62 and earphone 61 of the earphone-microphone 60.

When a call comes in, a ringer sound signal is supplied from the signal generator 22 to the incorporated speaker 24 through the amplifier 23. From the incorporated speaker 24, a ringer sound announcing an incoming call is output with a sufficient volume. At the same time, while the ringer sound signal is also supplied to the amplifier 36, a ringer sound with a suitable volume is output from the earphone 61.

Thus, conversing by telephone and receiving a call can be made by using the transmitter 11 and receiver 17 incorporated in the telephone 10 or the earphone-microphone 60. In this case, it is detected whether the earphone-microphone 60 is used or not by utilizing a change in voltage at the switch contact C of the jack 19 and, according to the result of the detection, the audio signal is selectively allowed to access the transmitter 11 and receiver 17 or the earphone-microphone 60. By virtue of this arrangement, it is made possible to reduce the necessary switch contacts for the jack 19 to one, the switch contact C, as shown in FIG. 4. Consequently, the amplifiers 32 and 36 and the switch circuits 33 and 35, together with the amplifiers 12 and 16 and the signal generator 22, can be integrated into an IC. Thus, the jack 19 can be made smaller and, since other circuits do not increase the volume, the telephone 10 can be made smaller.

There is used an electret condenser microphone unit for the microphone 62 of the earphone-microphone 60 to be connected to the telephone 10 as the transmitter-receiver according to the present invention. Therefore, the change in the voltage produced at the switch contact C of the jack 19 dependent on whether or not the earphone-microphone 60 is connected to the jack 19 can be easily obtained by the provision of the resistor R2. More specifically, since the resistor R1 and capacitor C1 are parts that are originally needed for operating the microphone when the electret condenser microphone unit is used for the microphone 62, the change in voltage at the switch contact C of the jack 19 can be obtained merely by providing the resistor R2. As with the telephone shown in FIG. 1, the portable telephone 10 according to the invention has the transmitter 11, receiver 17, antenna 14, jack 19, dial keys 25, and control keys 26 installed on the housing of the telephone 10. Such circuits and elements as the transmitter circuit 13, receiver circuit 15, switch circuits 33 and 35, signal generator 22, amplifiers 12 and 16, resistors R1 and R2, and capacitor C1 are contained in the housing of the telephone 10.

The above described case is of a portable telephone 10, but the invention can also be applied to a transceiver and the like. Although, in the above, the audio signal which is allowed to access the transmitter 11 and receiver 17 and the audio signal which is allowed to access the jack 19 are switched by the switch circuits 33 and 35, the arrangement is not limited to this. Namely, the signal S21 may be supplied to the amplifiers 12, 32, 16, and 36 as muting signals for switching the audio signal accessing the transmitter 11 and receiver 17 and the audio signal accessing the jack 19.

Although the microphone 62 was an electret condenser microphone unit in the above, it may be constituted for example of an electromagnetic microphone unit, in which case similar results may be obtained by inserting a blocking capacitor between the microphone 62 and the contact d of the plug 64. Further, instead of the switch contact C of the jack 19, a switch contact which, together with the output contact A, constitutes a normally closed switch may be provided to thereby obtain a difference in voltage similar to the above. Still further, when it is arranged so that the connections of the switch circuits 33 and 35 with respect to the levels "0" and "1" of the signal S21 are opposite to those shown in FIG. 4, the voltage supplied to the port PIN of the microcomputer 21 as it is received can be used also as the control signal S21.

What is claimed is:

1. A transmitter-receiver comprising:

a transmitter;

a transmitter circuit for converting a first audio signal to a transmit signal and transmitting the transmit signal on a first channel;

a receiver circuit for extracting a second audio signal from a received signal on a second channel distinct from the first channel;

a receiver;

a jack for connection to a plug of an external transmitter-receiver, said jack having an input contact, an output contact and only a single switch contact;

speaker means for generating a ringer sound;

signal generator means for generating a ringer sound signal and supplying said ringer sound signal to said speaker means and to said output contact of said jack in response to said received signal at said receiver circuit, said speaker means generating said ringer sound according to said ringer sound signal; and a switch being in one of two states dependent on whether said jack is connected to said plug, wherein when said jack is not connected to said plug said switch is in a first state and supplies said first audio signal from said transmitter to said transmitter circuit and also supplies said second audio signal from said receiver circuit to said receiver, and when said jack is connected to said plug said switch is in a second state and supplies an input audio signal from said external transmitter-receiver through said plug and said jack to said transmitter circuit as said first audio signal and also supplies said second audio signal from said receiver circuit to said external transmitter-receiver through said jack and said plug.

2. A transmitter-receiver according to claim 1, further comprising control means receiving an output signal from said switch, said control means responsive to the output signal supplied from said switch for selectively supplying either of the first audio signal output from said transmitter or the input audio signal from said external transmitter-receiver to said transmitter circuit and also supplying the second audio signal from said receiver circuit selectively to either of said receiver or said external transmitter-receiver.

3. A transmitter-receiver according to claim 2, wherein said input contact and said output contact and said switch contact constitutes said switch, and wherein when said jack is connected to said plug said control means supplies said input audio signal from said external transmitter-receiver to said transmitter circuit through said plug and said input contact of said jack and also supplies said second audio signal from said receiver circuit to said external transmitter-receiver through said output contact of said jack and said plug according to the output signal from said switch.

4. A transmitter-receiver according to claim 2, wherein said input contact and said output contact and said switch contact constituting said switch, and said transmitter-receiver further comprises a first resistor connected between one of said input contact and said output contact and a voltage source and a second resistor connected between said switch contact and ground, wherein when said jack is not connected with said plug said control means supplies said first audio signal from said transmitter to said transmitter circuit and also supplies said second audio signal from said receiver circuit to said receiver according to a first DC voltage value obtained from said switch contact, and when said jack is connected with said plug said control means supplies said input audio signal from said external transmitter-receiver to said transmitter circuit through said plug and said input contact of said jack and also supplies said second audio signal from said receiver circuit to said external transmitter-receiver through said output contact of said jack and said plug according to a second DC voltage value obtained from said switch contact.

5. A transmitter-receiver according to claim 1, further comprising amplifier means for amplifying said ringer sound signal and supplying an amplified ringer sound signal to said speaker means which generates said ringer sound having a sufficient volume therewith.

6. A transmitter-receiver comprising:

a transmitter;

a transmitter circuit for converting a first audio signal to a transmit signal and transmitting the transmit signal on a first channel;

a receiver circuit for extracting a second audio signal from a received signal on a second channel distinct from the first channel;

a receiver;

a jack having an output contact, an input contact, and only a single switch contact for connection to a plug of an external transmitter-receiver and wherein a switch is formed of said input contact, said output contact and said switch contact and is controlled between two states dependent on whether said jack is connected to said plug;

a first resistor connected between one of said input contact and said output contact and a voltage source;

a second resistor connected between said switch contact and ground;

speaker means for generating a ringer sound;

signal generator means for generating a ringer sound signal and supplying said ringer sound signal to said speaker means and to said output contact of said jack in response to said received signal at said receiver circuit, said speaker means generating said ringer sound according to said ringer sound signal; and control means receiving an output signal from said switch, wherein in a first state of said switch when said jack is not connected to said plug said control means supplying said first audio signal from said transmitter to said transmitter circuit and also supplying said second audio signal from said receiver circuit to said receiver according to a first DC voltage value obtained from said switch contact, and in a second state of said switch when said jack is connected to said plug said control means supplying an input audio signal from said external transmitter-receiver to said transmitter circuit through said plug and said input contact of said jack and also supplying said second audio signal from said receiver circuit to said external transmitter-receiver through said output contact of said jack and said plug according to a second DC voltage value obtained from said switch contact.

7. A transmitter-receiver according to claim 6, further comprising amplifier means for amplifying said ringer sound signal and supplying an amplified ringer sound signal to said speaker means which generates said ringer sound having a sufficient volume therewith.

8. A transmitter-receiver according to claim 6, wherein said transmitter is an electret microphone unit.

9. A transmitter-receiver according to claim 6, further comprising an antenna and a housing containing said transmitter, said receiver, said antenna, said jack, said transmitter circuit, said receiver circuit, said first resistor, said second resistor, and said control means.

10. A transmitter-receiver comprising:

a transmitter;

a transmitter circuit for converting a first audio signal to a transmit signal and transmitting the transmit signal on a first channel;

a receiver circuit for extracting a second audio signal from a received signal on a second channel distinct from the first channel;

a receiver;

a jack for connection to a plug of an external transmitter-receiver, said jack having an input contact, and output contact and only a single switch contact, control means controlled between two states dependent on whether said jack is connected to said plug, wherein in a first state when said jack is not connected to said plug said control means supplies said first audio signal from said transmitter to said transmitter circuit and also supplies said second audio signal from said receiver circuit to said receiver and in a second state when said jack is connected to said plug said control means supplies an input audio signal from said external transmitter-receiver to said transmitter circuit through said plug and said jack and also supplies said second audio signal from said receiver circuit to said external transmitter-receiver through said jack and said plug;

signal generator means for generating a ringer sound signal; and speaker means for generating a ringer sound according to said ringer sound signal, wherein said control means in response to said received signal supplies said ringer sound signal to said speaker means and to said output contact of said jack.

* * * * *

UNITED STATES PATENT AND TRADEMARK OFFICE
CERTIFICATE OF CORRECTION

PATENT NO. : 5,475,872
DATED : December 12, 1995
INVENTOR(S) : Tsutomu SATO

It is certified that error appears in the above-indentified patent and that said Letters Patent is hereby corrected as shown below:

On the Title Page, under <u>Other Publications,</u> line 3, change "Applicaiton" to --Application--

Col. 2, line 20, after "respectively" insert --,--
      line 35, after "respectively" insert --,--
      line 37, after "respectively" insert --,--
Col. 4, line 45, change "E" to --A--
      line 66, change "E" first occurence to --A--

Col. 9, line 9, change "," to --;--

Signed and Sealed this

First Day of July, 1997

Attest:

*Attesting Officer*

BRUCE LEHMAN

*Commissioner of Patents and Trademarks*